UNITED STATES PATENT OFFICE 1,985,190

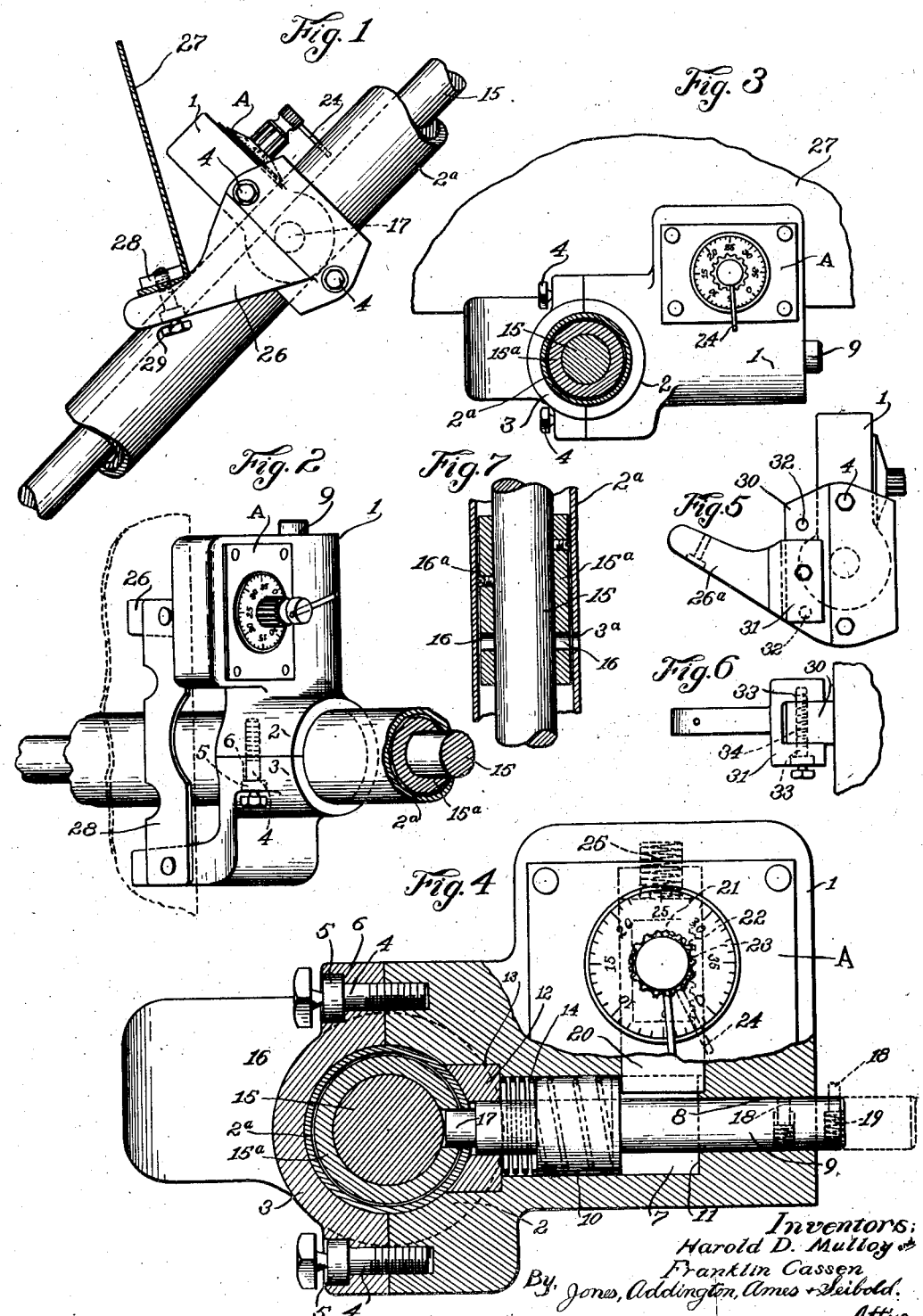

AUTOMOBILE LOCK

Harold D. Mulloy, Evanston, and Franklin Cassen, Chicago, Ill.

Application May 29, 1933, Serial No. 673,348

2 Claims. (Cl. 70—90)

This invention relates to locks, and has special reference to automobile steering wheel locks for preventing rotation of the steering wheel when the lock is in operative position.

More particularly, this invention has reference to a steering wheel lock which, when mounted and in operative position, will positively prevent rotation of the steering post even when the tubular column about the post has been fixed so as to be capable of rotation. The present lock preferably comprises a casing having portions thereon positioned for engagement with the dash or other immovable part of the automobile in which the lock is mounted. Locking mechanism is mounted in the casing and includes a plunger adapted to be moved toward and away from the steering column. When the lock plunger is moved to operative position, it passes through the tubular column and seats in a recess provided therefor in the steering post or a sleeve fixedly mounted on the steering post, being retained in such position by the locking bar of a lock which is preferably of the keyless or combination type. Upon release of the locking bar, the plunger is automatically moved to retracted position, permitting free rotation of the steering post, where it is positively held against movement to operative position by automatically acting means which must be manually released before the locking plunger may be again moved to operative position.

An object of the present invention is to provide a steering wheel lock adapted to be mounted on the tubular column of a steering post and having a lock plunger which passes through the tubular column and seats in the steering post.

Another object of the present invention is to provide a steering wheel lock for preventing rotation of the steering post, the lock, when in retracted position, being prevented from movement to operative position until such is intended.

A further object of the present invention is to provide a steering wheel lock of the type above described having means on the casing of the lock which engage the dash or other immovable part of the automobile in which it is mounted, thereby preventing rotation of the lock with the steering post even when the tubular column is permitted to rotate with the steering post.

Further objects and advantages will be apparent from the following description when considered with the accompanying drawing, in which latter:

Figure 1 is a side elevational view of a steering wheel lock embodying the present invention mounted on the tubular column of an automobile with portions engaging the lower edge of the dash;

Fig. 2 is a perspective view of the lock and associated parts shown in Figure 1;

Fig. 3 is a top plan view of the lock;

Fig. 4 is a horizontal cross sectional view of the mounted lock partly in elevation showing the operating mechanism thereof;

Fig. 5 is a side elevational view of an adjustable lug for engaging the dash of an automobile and the means of attachment thereof to the lock casing;

Fig. 6 is a top plan view of the lug shown in Fig. 5; and

Fig. 7 is a cross sectional view of the steering post with the sleeve mounted thereon surrounded by the tubular column.

Referring more particularly to the drawing, there is shown a casing 1 in which the lock parts are mounted. One end of the casing is provided with a split collar comprising elements 2 and 3 which are adapted to fit about the tubular column 2a of an automobile or other vehicle. Bolts 4 may be employed for securing elements 2 and 3 of the split collar about the tubular column. These bolts are preferably provided with twist-off heads designed to leave a shoulder 5 disposed within a suitable seat 6, as shown in Fig. 4. By using bolts of this type, in which heads are twisted off after the bolts are screwed tight, it is practically impossible for thieves or anyone else to remove the bolts 4.

Casing 1 is apertured to form a chamber 7 having connecting therewith a reduced passageway 8. A lock plunger 9, of substantially the same size as passageway 8, is mounted in the casing so as to be capable of reciprocal movement. Lock plunger 9 is provided with a collar 10 which reciprocates in chamber 7. Outward movement of plunger 9 with collar 10 affixed thereto is limited by a shoulder 11 formed between chamber 7 and passageway 8, while the inward movement of the collar 10 is limited by a plug 12 which is seated in an enlarged opening 13 provided at the inner end of the casing. Plug 12 is apertured to receive the inner end of plunger 9 and may be fastened to casing 1 by any desirable means, although this is not necessary, since, when the casing is mounted on the tubular column, the plug 12 abutting thereagainst will be held in a fixed position. A spring 14 may be positioned in chamber 7 about the inner end of the plunger 9 between plug 12 and the inner surface of collar 10, thus tending to maintain the plunger in outward or retracted position at all times.

The tubular column 2a is formed with an aperture 3a to permit the inner end of the plunger 9 to pass therethrough. A sleeve member 15a is fixedly mounted on the steering post 15 inside of the tubular column 2a opposite the lock. Screws or other suitable means 16a may be employed for holding the sleeve 15a in place on the steering post 15. Two recesses 16 are preferably provided in opposite sides of the sleeve member 15a so that, as the steering post 15 with the sleeve 15a thereon is rotated, the recesses 16 may register with the aperture 3a. Thus, when the plunger 9 is in operative or locked position, as shown in Fig. 4, the inner end 17 thereof passes through the tubular column and into recess 16 provided in sleeve 15a. As the steering post may be rotated two or three times in turning the wheel from one extreme position to the other, each of the recesses 16 will register with the aperture 3a various times during the turning operation and the steering post may be locked in any of these registering positions.

If desired, the sleeve 15a may be omitted and a recess formed in the steering post 15 for receiving the inner end of the plunger 9, which with this construction would have to be made longer in order to extend into the steering post. If the sleeve is omitted and the locking bolt extended to seat into the steering post, it might be possible to bend the steering post away from the plunger by exerting considerable force on the steering wheel to rotate the same. With the construction shown including the sleeve 15a, this would be impossible, as there is no room between the sleeve and the tubular column to permit the steering post to be bent sufficiently to become disengaged from the plunger 9.

In order to prevent accidental movement of the plunger to operative or locked position, safety means are provided on the outer end thereof. This may comprise a locking dog 18 mounted in a recess provided therefor in the plunger. A spring or other resilient means 19 positioned at the inner end of said recess tends to maintain the locking dog 18 in its extended position projecting outwardly from the plunger. In this position the locking dog 18 abuts the outer side of the casing and prevents movement of the plunger 9.

A lock A, which is preferably of the keyless or combination type, is mounted in casing 1 adjacent plunger 9. This may comprise a locking bar 20 which is apertured at 21 and provided with a rack 22 along an inner side thereof. A rotatable segment 23 meshes with rack 22 whereby, when handle 24 attached to the segment is rotated, the locking bar is moved upwardly or downwardly. A spring or other resilient means 25 bears against the upper end of locking bar 20, tending to move the same downwardly into its locked or operative position. The combination lock may be of any desired form which, upon being operated to open the same, permits the locking bar 20 to be moved to unlocked position, while holding the same in locked position when the locking bar is moved thereto by means such as handle 24. As the lock itself forms no part of this invention, further description thereof is not deemed necessary except in its relation to the other features of the invention.

Locking bar 20 is so positioned that, when the plunger 9 is in locked or operative position, bar 20 may be moved toward the same and will engage the outer surface of collar 10, thereby preventing retraction of plunger 9 until bar 20 is moved away therefrom. When this is done, spring 14 automatically moves the plunger 9 to its retracted position, where it is maintained by locking dog 18. When it is desired to lock the steering wheel, locking dog 18 is pushed within plunger 9 and then the plunger is moved inwardly. As soon as the collar 10 gets beyond the inner edge of bar 20, spring 25 urges the latter downwardly, where it engages the rear side of collar 10 and prevents retraction of plunger 9.

The casing 1 is preferably provided with lugs 26 which, when the lock is mounted on the tubular column, engage the lower edge of dash 27. Although it has been found desirable to have the lugs 26 lie adjacent the lower edge of the dash 27, the lugs 26 may abut or be connected to other immovable parts of the car, the purpose being to prevent rotation of the lock even when the tubular column is cut or otherwise fixed so as to permit rotation thereof. Without connecting the lugs to the dash or other immovable parts of the car, it would be possible to cut the steering column and steer the automobile, as the post, sleeve, tubular column, and lock would all rotate as a unit. Although it is not necessary to attach the lugs to the lower surface of the dash, this is deemed advisable.

Apertures are provided in the lugs for the reception of bolts 29 which are extended through the lower edge of the dash and threaded into a template or the like 28 provided on the opposite side of the dash. These bolts may also be of the twist-off head type so as to prevent removal of the lugs 26 from the dash.

In order to provide a standard lock which may fit various types of cars, the lugs may be adjustably connected to casing 1, as shown in Figs. 5 and 6, instead of being formed integrally therewith. The casing 1 is provided with projecting portions 30 which are preferably square or oblong in cross section, as shown in Fig. 6. The lugs 26a are formed with a forked or bifurcated inner end 31 which seats over the projecting portions 30, with the inner face of the bifurcated end 31 of the lugs lying closely adjacent the outer face of the projecting portions 30. A plurality of spaced apertures 32 are formed in each projecting portion 30, while the forked end 31 is provided with apertures 33 at opposite sides thereof for registering with the apertures 32. A bolt 34 of the twist-off head type may be employed for holding the lugs on the casing, once they have been properly positioned, with the apertures 33 registering with one of the apertures 32. Once the lugs have been positioned for a certain automobile, they need not be changed.

With the construction hereinabove described, the lock, when in operative position, at all times prevents rotation of the steering post, and, when in unlocked position, the safety catch prevents accidental movement of the plunger 9 to locked position.

While we have shown and described a preferred embodiment of our invention, it will be apparent to those skilled in the art that various modifications thereof may be made, and therefore we wish to be limited only by the scope of the prior art and the appended claims.

We claim:

1. A steering wheel lock for attachment to the tubular column of a steering post, comprising a casing, locking mechanism within said casing including a locking plunger mounted for movement toward and away from said column, said plunger when in operative position extending through said tubular column and into a recess associated with said post and when in retracted position having a portion extending out of said casing and permitting free rotation of said post, resilient means tending to maintain said plunger in retracted position, and positive acting means associated with said portion for preventing movement of said plunger from retracted position until said last means has been actuated.

2. A steering wheel lock for attachment to the tubular column of a steering post, comprising a casing, locking mechanism within said casing including a locking plunger mounted for movement toward and away from said column, said plunger when in operative position extending through said tubular column and into a recess associated with said post, and when in retracted position having a portion extending out of said casing and permitting free rotation of said post, resilient means tending to maintain said plunger in retracted position and positive acting means associated with said portion for preventing movement of said plunger from retracted position until said last means has been actuated, said last means comprising a locking dog mounted in said portion and resilient means for normally maintaining said dog projecting from said portion.

H. D. MULLOY.
FRANKLIN CASSEN.